United States Patent [19]

Mauz

[11] 3,960,929

[45] *June 1, 1976

[54] PROCESS FOR MANUFACTURE OF CONDENSATION PRODUCTS FROM PHENOLS AND ACETOACETIC ACID ESTERS

[75] Inventor: Otto Mauz, Niederhofheim, Taunus, Germany

[73] Assignee: Hoechst Aktiengesellschaft, Frankfurt am Main, Germany

[ * ] Notice: The portion of the term of this patent subsequent to June 1, 1993, has been disclaimed.

[22] Filed: Mar. 7, 1975

[21] Appl. No.: 556,220

Related U.S. Application Data

[63] Continuation of Ser. No. 402,752, Oct. 2, 1973, abandoned, which is a continuation-in-part of Ser. No. 82,791, Oct. 21, 1970, abandoned.

[30] Foreign Application Priority Data

Oct. 23, 1969 Germany............................ 1953332

[52] U.S. Cl. ............................................ 260/473 S
[51] Int. Cl.$^2$ ......................................... C07C 69/76
[58] Field of Search ................................. 260/473 S

[56] References Cited
UNITED STATES PATENTS

| | | | |
|---|---|---|---|
| 3,450,746 | 6/1969 | Stapfer ............................ | 260/473 S |
| 3,577,384 | 5/1971 | Mauz et al. ...................... | 260/473 S |
| 3,639,447 | 2/1972 | Taylor et al. .................... | 260/473 S |

*Primary Examiner*—Paul J. Killos
*Attorney, Agent, or Firm*—Curtis, Morris & Safford

[57] ABSTRACT

Bisphenol-carboxylic acid esters are prepared from definite phenols and acetoacetic acid esters by condensing the components in the presence of hydrogen chloride at a temperature of from −10° to +15°C, using ethyl mercaptan as catalyst; the obtained esters are useful for stabilizing plastic resins, as varnishing resins, and as fungicidal or bactericidal agents.

1 Claim, No Drawings

PROCESS FOR MANUFACTURE OF CONDENSATION PRODUCTS FROM PHENOLS AND ACETOACETIC ACID ESTERS

The present application is a continuation of application Ser. No. 402,752, filed Oct. 2, 1973, now abandoned which in turn is a continuation-in-part of application Ser. No. 82,791, filed Oct. 21, 1970, and now abandoned.

The present invention relates to a process for the manufacture of condensation products from phenols and acetoacetic acid esters.

It has been proposed in German specification No. 1,093,377 laid open to public inspection to carry out the condensation of phenol with levulinic acid at 40° to 80°C in hydrochloric acid of 37 to 40 % strength as catalyst.

It has been found, however, that this mode of operation cannot be used for the condensation of phenols with acetoacetic acid esters because the acetoacetic acid ester is saponified by the aqueous hydrochloric acid at a temperature above 20°C. The acetoacetic acid formed is not stable and decomposes at once into acetone and cabon dioxide. The acetone undergoes condensation with the phenols in the presence of hydrogen chloride, whereby derivatives of bis-(4-hydroxyphenyl)-dimethylmethane are formed.

From U.S. Pat. No. 3,427,345 it is known to use mercaptoacetic acid to speed up the reaction of a phenol with a levulinic ester. However, when mercaptoacetic acid is employed in a reaction of a phenol with acetoacetic acid esters only very poor yields are obtained. (see Comparative Example 1$b$).

From German Auslegeschrift No. 1,213,852 it is known to prepare 4.4-bis-(4-hydroxyphenyl)-pentanoic acids from a phenol and levulinic acid in the presence of hydrochloric acid and a mercapto compound. The preferred mercapto compound is methyl mercaptan. If ethyl mercaptan is used as catalyst the yields are much lower than with methylmercaptan (see Comparative Example 2 of German Offenlegungsschrift No. 1,213,852).

Surprisingly, quite the opposite is true when acetoacetic acid esters are used instead of levulinic acids. In this case ethyl mercaptan promotes the reaction much stronger and higher yields are obtained than with methyl mercaptan (see Comparative Example 1$c$).

It has now been found that the saponification of the acetoacetic acid ester can be inhibited by carrying out the condensation at low temperatures. Owing to the fact that the condensation takes place very slowly at low temperarture ethyl mercaptan is added as catalyst so that the equilibrium is obtained more rapidly.

The present invention provides a process for the manufacture of condensation products from phenols of general formula I

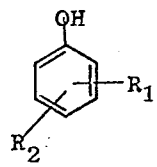

and acetoacetic acid esters of the general formula II

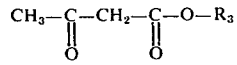

in which formulae $R_1$ and $R_2$ represent hydrogen atoms, identical or different alkyl radicals having 1 to 4 carbon atoms and $R_3$ stands for an alkyl radical having 1 to 31 carbon atoms, an allyl radical, the cyclohexyl radical, an arylradical or an aralkyl radical, which comprises carrying out the condensation in the presence of gaseous hydrogen chloride at a temperature in the range of from −10° to +15°C and in the presence of ethyl mercaptan, in an amount of from 0.05 to 0.5 % by weight, calculated on the acetoacetic acid ester used.

Suitable phenols which can be used in the condensation are, for example, phenol, o-cresol, 2-isopropylphenol, 2-sec.butyl-phenol, 2-tert.butylphenol, 2-methyl-4-sec. butyl-phenol, 2-methyl-4-tert.butylphenol, 2,6-dimethylphenol and 2,6-diiso-propylphenol.

The acetoacetic acid esters are prepared by adding diketene to the respective alcohol, using as catalyst basic compounds, for example triethyl amine. Alcohols having a high melting point are dissolved in a solvent that is inert towards diketene, whereupon the addition reaction with diketene is carried through.

To produce the acetoacetic acid esters the following alcohols may be used: methanol, ethanol, propanol, isopropanol, butanols, hexyl alcohols, nonyl alcohols, dodecanols, myristyl alcohol, cetyl alcohol, stearyl aclohol, myricyl alcohol, cyclohexanol, benzyl alcohol, phenyl-ethyl alcohol and allyl alcohol. To produce aromatic acetoacetic acid esters phenol or naphthol may be used.

To carry out the process of the invention at least two moles of phenol are used for each acetoacetyl group and the condensation is effected at a temperature of from −10° to +15°C, preferably at about 10°C, using 0.05 to 0.5 % by weight of ethyl mercaptan calculated on the acetoacetic acid ester used. The condensation may also be performed under a hydrogen chloride excess pressure of 1 to 3 atmospheres, a method which is especially suitable when operating on an industrial scale. An exact maintenance of the temperature is essential. At 20°C the acetoacetic acid ester is partially saponified. Therefore, the yields are considerably lower at higher temperatures. Owing to the low temperature of condensation it may sometimes be necessary to use solvents such as, for example, methylene chloride, toluene, or anisole.

The condensation being terminated, the dissolved hydrogen chloride, water and mercaptan are removed by means of a water jet vacuum pump at a temperature of from 10° to 20°C. The phenol in excess which has not reacted is then eliminated by distillation at 100° to 180°C under a pressure of about 1 mm of mercury. When the residue has a resin-like nature, it is recrystallized or precipitated from a solution by adding a non-solvent.

The bisphenol carboxylic acid esters obtained by the process of the invention can be used for many purposes, for example for the stabilization of plastics materials, as fungicidal or bactericidal agents, or for the manufacture of varnishing resins.

In the following table there are indicated the refractive indices at 20°C of the acetoacetic acid ester used in Examples 1 to 8.

| acetoacetic acid isopropyl ester | $n_D^{20}$ | 1.4167 |
| acetoacetic acid n-butyl ester | $n_D^{20}$ | 1.4271 |
| acetoacetic acid cyclohexyl ester | $n_D^{20}$ | 1.4580 |
| acetoacetic acid allyl ester | $n_D^{20}$ | 1.4400 |
| acetoacetic acid n-dodecyl ester | $n_D^{20}$ | 1.4472 |
| acetoacetic acid benzyl ester | $n_D^{20}$ | 1.5118 |

The following examples illustrate the invention.

EXAMPLE 1

1. [3,3-bis(4-hydroxy-3-tert.butylphenyl)-butanoic acid] isopropyl ester

A four-necked flask, provided with stirrer, reflux condenser, thermometer and gas inlet tube, was charged with 300 grams of o-tert.butylphenol (2 moles), 144 grams acetoacetic acid isopropyl ester (1 mole) and 0.72 gram of ethyl mercaptan. The reaction mixture was cooled to 10°C and saturated with hydrogen chloride at said temperature while stirring. The condensation was weakly exothermic. After a time of condensation of about 10 hours 1 liter of toluene was added and the condensation water formed was distilled off in the form of an azeotrope. When the toluenic solution was cooled, the final product separated in the form of a crystalline white substance.

Yield 358 grams (84 %, calculated on the acetoacetic acid ester used)

Melting point 176°23 C

Analysis: $C_{27}H_{38}O_4$. Found: 75.9 % C; 8.9 % H; Calculated: 76.0 % C; 8.9 % H.

Comparative Example 1a

Condensation at 40°C

The condensation was carried out at 40°C using
300 grams of o-tert. butylphenol
144 grams of acetoacetic acid isopropyl ester
0.72 gram of ethyl mercaptan
and continued for 10 hours. The reaction product obtained was worked up as described above.

Yield 192 grams (45 %, calculated on the acetoacetic acid ester used)

Melting point 170°C.

Comparative Example 1b

Condensation with mercapto-acetic acid as catalyst according to U.S. Pat. No. 3,427,345

Example 1 was repeated with the only difference that ethyl mercaptan was replaced by 1.0 gram of mercaptoacetic acid.

Yield: 65 grams (15 % calculated on the acetoacetic ester used)

Melting point 174°C.

Comparative Example 1c

Condensation in the presence of methyl mercaptan instead of ethyl mercaptan

Example 1 was repeated with the only difference that ethyl mercaptan was replaced by 0.72 gram methyl mercaptan.

Yield: 204 g (48 % calculated on the acetoacetic ester used)

Melting point 176°C.

EXAMPLE 2

3,3-bis(4-hydroxy-3-methylphenyl)-butanoic acid n-butyl ester

The apparatus described in Example 1 was charged with 2,160 grams of o-cresol (20 moles), 760 grams of acetoacetic acid n-butyl ester (5 moles) and 0.76 gram of ethyl mercaptan; the reaction mixture was cooled at 10°C and saturated with gaseous hydrogen chloride. The condensation was continued for about 20 hours at 10°C. By means of a water jet vacuum pump hydrochloric acid and o-cresol were distilled off while the temperature of the bath was slowly raised from 20° to 150°C. The resinous product obtained after distillation was recrystallized in 3 liters of xylene with the addition of a small amount of kieselguhr.

Yield 1,220 grams (68 %, calculated on the acetoacetic acid n-butyl ester used)

Melting point 116°C

Analysis: $C_{22}H_{28}O_4$. Found: 73.9 % C; 7.9 % H; Calculated: 74.1 % C; 7.9 % H.

EXAMPLE 3

[3,3-bis(4-hydroxy-3-tert.butylphenyl)-butanoic acid] allyl ester

The apparatus described in Example 1 as charged with 1,200 grams of o-tert.butylphenol (8 moles), 568 grams of acetoacetic acid allyl ester (4 moles) and 2.8 grams of ethyl mercaptan, the reaction mixture was cooled to 10°C and saturated with gaseous hydrogen chloride. Condensation was continued for 24 hours, the condensation temperature not exceeding 10°C. To remove the water formed in the condensation, toluene was added and the water distilled off in the form of an azeotrope. When the distillation residue was cooled the 3,3-bis(4-hydroxy-3-tert.butylphenyl)-butanoic acid allyl ester separated from the toluene in the form of a white crystalline compound.

Yield 1,050 grams (62 % calculated on the acetoacetic acid ester used)

Melting point 124°C

Analysis: $C_{27}H_{36}O_4$. Found: 75.8 % C; 8.4 % H; Calculated: 76.4 % C; 8.5 % H.

EXAMPLE 4

[3,3-bis(4-hydroxy-3-tert.butylphenyl)-butanoic acid] cyclohexyl ester 300 grams of o-tert.butylphenol (2 moles), 184 grams of acetoacetic acid cyclohexyl ester (1 mole) and 0.9 gram of ethyl mercaptan were mixed in a four necked flask and the mixture was saturated with gaseous hydrogen chloride at 10°C. After a time of condensation of 24 hours at a temperature of 5° to 10°C, toluene was added and the condensation water distilled off as an azeotrope. When the reaction mixture was cooled the 3,3-bis(4-hydroxy-3-tert.butylphenyl)-butanoic acid cyclohexyl ester separated from the toluene in the form of crystals.

Yield 384 grams (82 %, calculated on the acetoacetic acid ester used)

Melting point 168°C

Analysis: $C_{30}H_{42}O_4$. Found: 77.9 % C; 9.1 % H; Calculated: 77.3 % C; 9.0 % H.

EXAMPLE 5

[3,3-bis (4-hydroxy-3,5-dimethylphenyl)-butanoic acid] dodecyl ester

In a four-necked flask 122 grams of 2,6-dimethylphenol (1 mole), 135 grams of acetoacetic acid dodecyl ester (0.5 mole) and 0.7 gram of ethyl mercaptan were mixed and gaseous hydrogen chloride was passed through the mixture for 8 hours at 10°C. The mixture was stirred for 24 hours at 10°C. Toluene was added and the water formed was distilled off as an azeotrope. After cooling the 3,3-bis(4-hydroxy-3,5-dimethylphenyl)-butanoic acid dodecyl ester separated from the toluenic solution in the form of crystals.

Yield 176 grams (71 % calculated on the acetoacetic acid ester)

Melting point 121°C

Analysis: $C_{32}H_{48}O_4$. Found: 77.4 % C; 9.8 % H; Calculated: 77.4 % C; 9.6 % H.

EXAMPLE 6

[3,3-bis(2-hydroxy-3-methyl-5-tert.butylphenyl)-butanoic acid] isopropyl ester

Gaseous hydrogen chloride was introduced for about 10 hours at 5° to 10°C into a mixture of 328 grams of 2-methyl-4-tert.butylphenol (2 moles), 144 grams of acetoacetic acid isopropyl ester (1 mole) and 0.7 gram of ethyl mercaptan. The condensation was continued for about 48 hours at 5° – 10°C, whereupon water and hydrochloric acid were removed at room temperature by means of a water jet vacuum pump. The temperature of the bath was slowly raised to 100°C under a pressure of 0.1 mm of mercury. After the distillation of all unreacted 2-methyl-4-tert.butylphenol, the impurities still present were dissolved in toluene.

Yield 127 grams (28 %, calculated on the acetoacetic acid ester)

Melting point 162°C

Analysis: $C_{29}H_{42}O_4$. Found: 77.8 % C; 8.9 % H; Calculated: 76.6 % C; 9.2 % H.

The relatively low yield in this example is probably due to steric hindrance.

EXAMPLE 7

[3,3-bis(4-hydroxy-3-tert.butylphenyl)-butanoic acid] benzyl ester

In a reaction flask 450 grams of o-tert.butylphenol (3 moles), 192 grams of acetoacetic acid benzyl ester (1 mole) and 0.98 gram of ethyl mercaptan were mixed and condensed for 48 hours at 10°C in the presence of gaseous hydrogen chloride. The hydrochloric acid was removed at about 15°C by means of a water jet vacuum pump under a pressure of 10 mm of mercury, the remainder of o-tert.butylphenol was distilled off under 5 mm of mercury. A brittle brown resin remained behind. The crude product was dissolved in toluene, clarified with bleaching earth, precipitated with hexane after separation of the bleaching earth by filtration.

Yield 394 grams (83 %, calculated on the acetoacetic ester)

Melting point 113°C

Analysis: $C_{31}H_{38}O_4$. Found: 78.1 % C; 7.9 % H; Calculated: 78.5 % C; 8.0 % H.

EXAMPLE 8

[3,3-bis(4-hydroxy-3.5-dimethylphenyl)-butanoic acid] benzyl ester 183 grams of 2,6-dimethylphenol (1.5 moles), 98 grams of acetoacetic acid benzyl ester (0.5 mole) and 0.5 gram of ethyl mercaptan were dissolved in 100 milliliters of anisole and the mixture was condensed for 48 hours at 10°C in the presence of gaseous hydrogen chloride. The hydrochloric acid was removed by means of a water jet vacuum pump, the solvent and 2,6-dimethylphenol were separated with an oil pump under a pressure of about 1 mm of mercury while temperature of the bath was raised to 190°C. The resinous residue was recrystallized from toluene.

Yield 138 grams (66 %, calculated on the acetoacetic acid ester)

Melting point 77°C

Analysis: $C_{27}H_{30}O_4$. Found: 76.8 % C; 7.2 % H; Calculated: 77.4 % C; 7.2 % H.

I claim:

1. In a process for the manufacture of bisphenolcarboxylic acid esters from phenols of general formula I

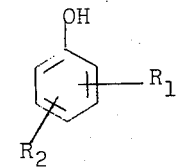

and acetoacetic acid esters of general formula II

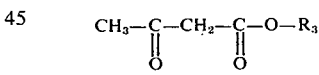

in which formulae $R_1$ and $R_2$ each represent a hydrogen atom, identical or different alkyl radicals having 1 to 4 carbon atoms and $R_3$ stands for an alkyl radical having 1 to 31 carbon atoms, an allyl radical, the cyclohexyl radical, phenyl, napthyl, benzyl, or phenethyl, the improvement of which comprises condensing I and II in the presence of gaseous hydrogen chloride at a temperature of from −10° to +15°C using 0.05 to 0.5 % by weight of ethyl mercaptan, calculated on the acetoacetic acid ester, as catalyst.

* * * * *